(12) United States Patent
Sumino et al.

(10) Patent No.: US 7,407,579 B2
(45) Date of Patent: Aug. 5, 2008

(54) METHOD AND APPARATUS FOR TREATING AMMONIUM-CONTAINING LIQUID

(75) Inventors: Tasuo Sumino, Chiyoda-ku (JP); Kazuichi Isaka, Chiyoda-ku (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 238 days.

(21) Appl. No.: 11/258,847

(22) Filed: Oct. 27, 2005

(65) Prior Publication Data

US 2006/0091073 A1    May 4, 2006

(30) Foreign Application Priority Data

Nov. 1, 2004    (JP) ............... 2004-318092

(51) Int. Cl.
*C02F 3/28*    (2006.01)
(52) U.S. Cl. .................. 210/603; 210/631; 210/198.1; 210/205; 210/903
(58) Field of Classification Search .......... 210/603, 210/614, 631, 903, 198.1, 205, 252, 259
See application file for complete search history.

(56) References Cited

U.S. PATENT DOCUMENTS 5,221,486 A * 6/1993 Fassbender .................. 210/757
6,015,496 A * 1/2000 Khudenko .................. 210/603

FOREIGN PATENT DOCUMENTS

| JP | A 10-314787 | 12/1998 |
| JP | A 2001-37467 | 2/2001 |
| JP | A 2004-255269 | 9/2004 |

OTHER PUBLICATIONS

Guven et al; Implementation of the Anammox Process for Improved Nitrogen Removal; Journal of Environmental Science and Health; vol. A39; No. 7; 2004; pp. 1729-1738.
Strous et al; Ammonium Removal From Concentrated Waste Streams With The Anaerobic Ammonium Oxidation (Anammox) Process In Different Reactor Configurations; Water Research; vol. 31; No. 8; 1997; pp. 1955-1962.
Ahn et al; Anammox and partial denitritation in anaerobic nitrogen removal from piggery waste; Water and Science Technology; vol. 49; No. 5-6; 2004; pp. 145-153.

* cited by examiner

*Primary Examiner*—Fred G. Prince
(74) *Attorney, Agent, or Firm*—Oliff & Berridge, PLC

(57) ABSTRACT

The method for treating an ammonium-containing liquid which biologically denitrifies ammonium contained in the ammonium-containing liquid in an anaerobic atmosphere, the method comprises the steps of: bringing the ammonium-containing liquid into contact with anaerobic bacteria in a biological treatment tank, the anaerobic bacteria having an ability to biologically denitrify the ammonium in the anaerobic atmosphere; and adding nitrite to the biological treatment tank from a nitrite storage tank concurrently with the bringing step, the nitrite storage tank storing the nitrite with a certain concentration.

16 Claims, 7 Drawing Sheets

METHOD AND APPARATUS FOR TREATING AMMONIUM-CONTAINING LIQUID

BACKGROUND OF THE INVENTION

1. Field of the Invention

The present invention relates to a method and an apparatus for treating an ammonium-containing liquid, in particularly to a technology for biologically denitrifying ammonium in an ammonium-containing liquid generated in various fields such as the field of wastewater treatment and the field of fine chemicals.

2. Description of the Related Art

Ammonium containing liquids with low to high concentrations are generated in industrial wastewater, photographic development wastewater, and wastewater from chemical factories to produce chemical products, for example. Since those ammonium-containing liquids cause eutrophication and lowering the level of dissolved oxygen in waters if discharged as wastewater, it is necessary that ammonium be purged before discharging the liquids. Furthermore, it is necessary that ammonium be purged from liquid chemical products containing ammonium in order to increase purity of the chemical products.

Conventionally, ammonium-containing liquids with low concentrations are oxidized by chlorine or are treated biologically. In the chlorine treatment, chlorine is reacted with ammonium to remove ammonium, and produces chloramine at the same time. The chloramine may disturb the ecosystem in the environment by a highly bactericidal effect thereof. In addition, the chlorine treatment requires a large amount of chlorine. Therefore, the chlorine treatment is not used for treating ammonium-containing liquids with middle to high concentrations, and generally, such the liquids are treated biologically by nitrification and denitrification.

Such the biological treatment by nitrification and denitrification is performed by nitrification in which ammonium is converted into nitrate through nitrite by nitrification bacteria, and denitrification in which nitrate is converted into nitrogen gas by denitrification bacteria. However, in the treatment of ammonium-containing liquids by nitrification and denitrification, an organic substance is required in denitrification reaction, in other words, it is necessary to add methanol as the organic substance in an amount three times greater than nitrogen. Therefore, since a greater amount of methanol is used as the concentration of ammonia is higher, such the treatment has a disadvantage in that not only an initial cost but also a running cost is increased.

In order to resolve this problem, recently, anaerobic ammonium oxidation is suggested as efficient biological treatment (see Japanese Patent Application Publication No. 2001-037467, for example). The anaerobic ammonium oxidation comprises the steps of: converting a part of ammonium into nitrite by nitrite-type nitrification reaction using ammonium oxidizing bacteria; and denitrifying the nitrite and the remaining ammonium using anaerobic ammonium oxidizing bacteria. The anaerobic ammonium oxidation requires only a small amount of oxygen in the nitrification, and does not require an organic substance in the denitrification. Therefore, it is possible to reduce a running cost for the treatment, considerably.

Although the treatment of ammonium-containing liquids by anaerobic ammonium oxidation can considerably reduce the running cost as described above, the nitrification for converting a part of ammonium into nitrite is not stable, and thus the concentration of nitrite to be reacted with ammonium tends to be changed over time. Therefore, it is difficult to react to nitrite with ammonium by denitrification constantly at a preferable ratio between nitrite and ammonium, and then ammonium-containing liquids cannot be treated in a stable manner, thereby causing treatment quality of the liquids to vary.

SUMMARY OF THE INVENTION

The present invention has been contrived in view of such circumstances, and an object thereof is to provide a method and an apparatus for treating an ammonium-containing liquid that can provide a treated liquid with high quality constantly stably by treating an ammonium-containing liquid constantly stably.

In order to attain the aforementioned object, the present invention is directed to a method for treating an ammonium-containing liquid which biologically denitrifies ammonium contained in the ammonium-containing liquid in an anaerobic atmosphere, the method comprising the steps of: bringing the ammonium-containing liquid into contact with anaerobic bacteria in a biological treatment tank, the anaerobic bacteria having an ability to biologically denitrify the ammonium in the anaerobic atmosphere; and adding nitrite to the biological treatment tank from a nitrite storage tank concurrently with the bringing step, the nitrite storage tank storing the nitrite with a certain concentration.

In a conventional manner, a part of ammonium is converted into nitrite by nitrite-type nitrification reaction using ammonium oxidizing bacteria, and the converted nitrite and the remaining ammonium is denitrified by anaerobic bacteria, thereby causing the concentration of nitrite to be reacted with ammonium to vary over time. According to the present invention, in consideration of the conventional manner, nitrite with a certain concentration is stored in the nitrite storage tank, and then nitrite with a certain concentration is added to the biological treatment tank from the nitrite storage tank.

In other words, conventionally, there has not been a technical thought involving controlling nitrite to be reacted with ammonium to have a certain concentration in a nitrite storage tank, and adding the nitrite controlled to have the certain concentration in a biological treatment tank. Therefore, since the treatment is performed according to the technical thought, nitrite to be reacted with ammonium can be constantly maintained to have a certain concentration. If nitrite can be constantly maintained to have the certain concentration, it is possible to control an amount of nitrite required for the denitrification precisely by controlling an amount of nitrite added to the biological treatment tank. Accordingly, since nitrite is reacted with ammonium by denitrification constantly at a preferable ratio between nitrite and ammonium in the presence of anaerobic ammonium oxidizing bacteria, it is possible to treat an ammonium-containing liquid in a stable manner, thereby providing a treated liquid with constantly stable and high quality.

Herein, nitrite with a certain concentration stored in the nitrite storage tank may be nitrite of a naturally occurring substance, or may be chemically synthesized substance such as nitrite metal salt, or may be nitrite biologically produced by ammonium oxidizing bacteria in a nitrite-type nitrification tank. It is basically enough only if nitrite with the certain concentration can be added to the biological treatment tank from the nitrite storage tank.

The present invention is also directed to the method for treating the ammonium-containing liquid wherein: the nitrite is added from the nitrite storage tank to a plurality of places which are variously located in the biological treatment tank so that a highest concentration of nitrite nitrogen is lower than 80 mg/L in the biological treatment tank.

When a plurality of nitrite concentrations are distributed in the biological treatment tank, ammonium and nitrogen cannot be finally formed in the entire biological treatment tank at a preferable ratio between nitrite and ammonium, even if nitrite with a certain concentration is added to the biological treatment tank. In particular, in anaerobic ammonium oxidation bacteria, nitrite is used as a substrate, but the activity of nitrate is reduced when the nitrite nitrogen concentration is 80 mg/L or higher. Therefore, according to the present invention, it is preferable to add nitrite to a plurality of places variously located in the biological treatment tank from the nitrite storage tank, so that the nitrite has a highest nitrite nitrogen concentration of lower than 80 mg/L in the biological treatment tank.

The present invention is also directed to the method for treating the ammonium-containing liquid further comprising the steps of: measuring a concentration of ammonium nitrogen in the ammonium-containing liquid; calculating a necessary amount of the nitrite with respect to the concentration measured in the measuring step; and controlling an amount of the nitrite added in the adding step according to the necessary amount calculated in the calculating step.

According to the present invention, it is possible to treat effectively when the ammonium concentration in an ammonium-containing liquid varies, as one example of controlling the added amount of nitrite stored in a nitrite storage tank with a certain concentration. More specifically, the necessary amount of nitrite is calculated from the concentration value of ammonium nitrogen which is obtained by measuring the ammonium-containing liquid, and then the amount of nitrite with a certain concentration to be added is controlled according to the calculation results. Therefore, it is possible to appropriately control the amount of nitrite added in accordance with the ammonium concentration of the ammonium-containing liquid. In this case, the ammonium nitrogen concentration in the ammonium-containing liquid may be measured continuously or intermittently.

The present invention is also directed to the method for treating the ammonium-containing liquid further comprising the steps of: measuring an inflow volume of the ammonium-containing liquid flowing into the biological treatment tank; and changing an amount of the nitrite added in the adding step corresponding to variations in the inflow volume measured in the measuring step.

According to the present invention, it is possible to provide the method to treat effectively when the ammonium concentration in an ammonium-containing liquid is certain as in development wastewater, as one example of controlling the added amount of nitrite stored in a nitrite storage tank with a certain concentration. More specifically, when the amount of nitrite added is decided at once corresponding to the necessary amount of nitrite, the added amount of nitrite may be changed corresponding to variations in the inflow volume of the ammonium-containing liquid. The amount of nitrite added corresponding to the necessary amount of nitrite may be decided by calculating the necessary amount from measurement for the ammonium-containing liquid as described above. Therefore, it is possible to control appropriately the amount of nitrite added in accordance with the inflow volume of the ammonium-containing liquid. In this case, the inflow volume of the ammonium-containing liquid may be measured continuously or intermittently.

Furthermore, in addition to measuring of the ammonium nitrogen concentration in the ammonium-containing liquid, when measuring the volume of the ammonium-containing liquid flowing into the biological treatment tank, so that the added amount of nitrite are controlling according to both the ammonium nitrogen concentration and the inflow amount, the amount of nitrite added can be more accurately controlled.

The present invention is also directed to the method for treating the ammonium-containing liquid wherein the necessary amount of the nitrite is set so that an amount of nitrite nitrogen in the nitrite is 1 to 1.5 times of an amount of the ammonium nitrogen in the ammonium.

According to the present invention, a preferable necessary amount of nitrite is described above. When the necessary amount is set so that the amount of nitrite nitrogen in nitrite is 1 to 1.5 times of the amount of ammonium nitrogen in ammonium, it is possible to improve performance of purging nitrogen from the ammonium-containing liquid, remarkably.

The present invention is also directed to the method for treating the ammonium-containing liquid further comprising the steps of: changing an amount of the nitrite added in the adding step to the biological treatment tank from the nitrite storage tank; measuring a production rate (L/min) of nitrogen gas produced in the biological treatment tank when changing the amount of the nitrite in the changing step; and controlling the amount of the nitrite added in the adding step to a necessary amount of the nitrite, the necessary amount of the nitrite being the amount of the nitrite which is added when the measured production rate are not changed corresponding to the amount of the nitrite changed in the changing step.

According to the present invention, as one example of controlling the added amount of nitrite stored in a nitrogen storage tank with a certain concentration, it is possible to provide the method to treat effectively for controlling the added amount of nitrite corresponding to variations in the treatment load such as the ammonium concentration in the ammonium-containing liquid and the volume of the liquid flowing into a biological treatment tank.

More specifically, in a biological treatment tank, ammonium is reacted with nitrite in the presence of anaerobic ammonium oxidizing bacteria to produce nitrogen gas. The production rate of nitrogen gas is changed corresponding to variations in the treatment load such as the ammonium concentration and the inflow volume. For example, when the production rate of nitrogen gas is increased as the added amount of nitrite is increased, the added amount of nitrite may be insufficient. Thus, the added amount of nitrite is repeatedly increased until the production rate is not increased. On the other hand, when the production rate of nitrogen gas is not increased even if the added amount of nitrite is increased, the added amount of nitrite is excessive, and then activity of anaerobic ammonium oxidizing bacteria may be reduced. Thus, the added amount of nitrite is decreased until the production rate is decreased. In this manner, the added amount of nitrite is repeatedly changed to determine an added amount of nitrite that the gas production rate is not changed. With reference to such the determined amount as the necessary amount of nitrite, the added amount of nitrite is controlled. Therefore, it is possible to control appropriately the added amount of nitrite, even if the ammonium nitrite concentration in the ammonium-containing liquid or the inflow volume of the liquid is not measured. Furthermore, it is also possible to control the added amount of nitrite corresponding to variations in the treatment load such as the ammonium concentration and the inflow volume.

In order to attain the aforementioned object, the present invention is directed to an apparatus for treating an ammonium-containing liquid which denitrifies ammonium contained in the ammonium-containing liquid biologically in an anaerobic atmosphere, the apparatus comprising: a biological treatment tank which includes anaerobic bacteria having an ability to denitrify the ammonium biologically in the anaerobic atmosphere; an inflow section which allows the ammonium-containing liquid to flow into the biological treatment tank; a discharge section which discharges the liquid treated in the biological treatment tank; a nitrite storage tank which stores nitrite with a certain concentration; an addition device which adds the nitrite to the biological treatment tank from the nitrite storage tank; and an addition amount control device which controlling an amount of the nitrite added by the addition device.

According to the present invention, the apparatus is also provided for attaining the aforementioned objects. Therefore, it is possible to treat an ammonium-containing liquid constantly stably, thereby providing a treated liquid with high quality constantly stably.

The present invention is also directed to the apparatus for treating the ammonium-containing liquid wherein the addition device comprises a concentration distribution prevention mechanism which prevents a concentration of the added nitrite from varying in the biological treatment tank.

According to the present invention, since the addition device comprises a concentration distribution prevention mechanism to prevent from varying the concentration of the nitrite added into the biological treatment tank, it is possible to add nitrite with a certain concentration into the biological treatment tank. Furthermore, it is also possible to maintain a preferable ratio between ammonium and nitrite in the entire biological treatment tank.

The present invention is also directed to the apparatus for treating the ammonium-containing liquid further comprising a concentration measurement device which measures a concentration of ammonium nitrogen in the ammonium-containing liquid, wherein the addition amount control device controls the added amount of the nitrite according to the concentration measured by the concentration measurement device.

According to the present invention, it is possible to provide the apparatus to treat effectively when the ammonium concentration in an ammonium-containing liquid varies, as one example of controlling the amount of nitrite with a certain concentration added, stored in a nitrite storage tank.

The present invention is also directed to the apparatus for treating the ammonium-containing liquid further comprising an inflow volume measurement device which measures an inflow volume of the ammonium-containing liquid flowing into the biological treatment tank, wherein the addition amount control device controls the added amount of the nitrite according to the inflow volume measured by the inflow volume measurement device.

According to the present invention, it is possible to provide the apparatus to treat effectively when the ammonium concentration in an ammonium-containing liquid is certain as in development wastewater, as one example of controlling the added amount of nitrite stored in a nitrite storage tank with a certain concentration.

The present invention is also directed to the apparatus for treating the ammonium-containing liquid further comprising a gas production rate measurement device which measures a production rate (L/min) of nitrogen gas produced in the biological treatment tank when changing the amount of the nitrite added by the addition device, wherein the addition amount control device controls the added amount of the nitrite according to variations in the production rate measured by the gas production rate measurement device.

According to the present invention, as one example of controlling the added amount of nitrite stored in a nitrogen storage tank with a certain concentration, it is possible to provide the apparatus to treat effectively for controlling the amount of nitrite added corresponding to variations in the treatment load such as the ammonium concentration in the ammonium-containing liquid and the volume of the liquid flowing into a biological treatment tank.

In order to attain the aforementioned object, the present invention is directed to an apparatus for treating an ammonium-containing liquid which denitrifies ammonium contained in the ammonium-containing liquid biologically in an anaerobic atmosphere, the apparatus comprising: a plurality of biological treatment tanks which include anaerobic bacteria having an ability to denitrify the ammonium biologically in the anaerobic atmosphere; a plurality of inflow sections which allow the ammonium-containing liquid to flow into the biological treatment tanks; a plurality of discharge sections which discharge the liquid treated in the biological treatment tanks; a nitrite storage tank which stores nitrite with a certain concentration; a plurality of addition devices which add the nitrite to the biological treatment tanks from the nitrite storage tank; and an addition amount control device which controlling an amount of the nitrite added by the addition devices, wherein: each of the biological treatment tanks has a removable cartridge structure; a plurality of connection sections are provided respectively in the inflow sections, the discharge sections, and the addition devices; and the biological treatment tanks are connected via the connection sections to the inflow sections, the discharge sections, and the addition devices.

The present invention is also directed to the apparatus for treating the ammonium-containing liquid wherein each of the addition devices comprises a concentration distribution prevention mechanism which prevents a concentration of the added nitrite from varying in each of the biological treatment tanks.

The present invention is also directed to the apparatus for treating the ammonium-containing liquid further comprising a concentration measurement device which measures a concentration of ammonium nitrogen in the ammonium-containing liquid, wherein the addition amount control device controls the added amount of the nitrite according to the concentration measured by the concentration measurement device.

The present invention is also directed to the apparatus for treating the ammonium-containing liquid further comprising an inflow volume measurement device which measures an inflow volume of the ammonium-containing liquid flowing into each of the biological treatment tanks, wherein the addition amount control device controls the added amount of the nitrite according to the inflow volume measured by the inflow volume measurement device.

The present invention is also directed to the apparatus for treating the ammonium-containing liquid further comprising a gas production rate measurement device which measures a production rate (L/min) of nitrogen gas produced in each of the biological treatment tanks when the amount of the nitrite added by each of the addition devices is changed, wherein the addition amount control device controls the added amount of the nitrite according to variations in the production rate measured by the gas production rate measurement device.

According to the present invention, the biological treatment tanks comprise a plurality of the connection sections which can be removably attached respectively to the inflow section, the discharge section, and the addition device, as a removable cartridge structure. Therefore, an ammonium-containing liquid can be treated in the multiple biological treatment tanks by rotation, or one of the multiple biological treatment tanks can be also used as a biological treatment tank reserved for emergency. In the biological treatment tanks having a removable cartridge structure, even if anaerobic ammonium oxidizing bacteria have reduced activity or are killed in one of the biological treatment tanks, the biological treatment tank can be easily exchanged with another biological treatment tank, or a reserved biological treatment tank can be used instead.

As described above, according to the present invention, it is possible to treat an ammonium-containing liquid constantly stably, thereby providing a treated liquid with constantly stable and high quality.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
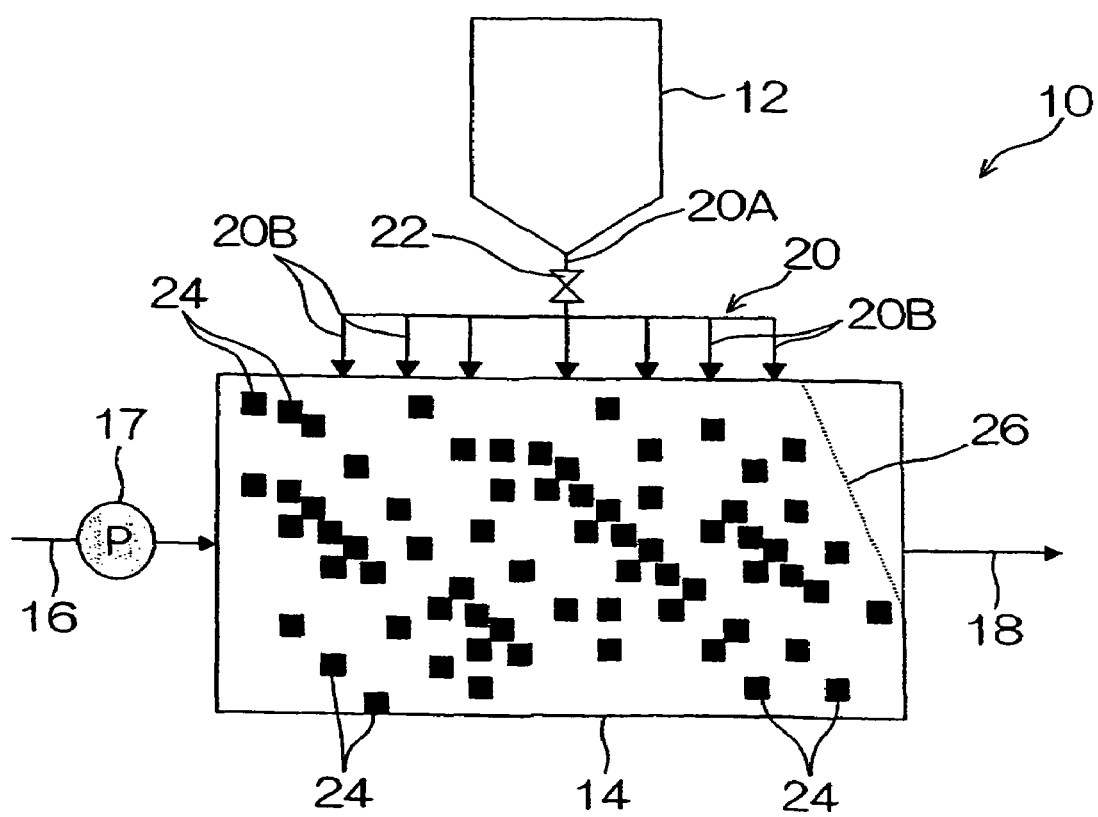
FIG. 1 is a general schematic drawing of an ammonium-containing liquid treatment apparatus according to a first embodiment of the present invention.

As shown in various embodiments of FIGS. 1, 3, 4, 5, and 7, each of ammonium-containing liquid treatment apparatuses 10, 50, 60, 70, and 80 according to the present invention includes a nitrite storage tank 12 and a biological treatment tank 14 as basic constituents, which is constituted by equipping the basic constituents with various measurement, control devices, and the like. Accordingly, the nitrite storage tank 12 and the biological treatment tank 14 as basic constituents will be described first.

The nitrite storage tank 12 stores a solution of nitrite metal salt in a solvent (generally, water) provided as nitrite with a certain concentration, or a powder of nitrite metal salt controlled to be nitrite with a certain concentration. A necessary amount of nitrite appropriate for treating ammonium in an ammonium-containing liquid is added to the biological treatment tank 14 from the nitrite storage tank 12 according to the various measuring results and controls. In this case, nitrite stored in the nitrite storage tank 12 is not limited to a naturally occurring substance and a chemically synthesized substance such as the aforementioned nitrite metal salt, and may be nitrite produced when ammonium is nitrified by ammonium bacteria in a nitrite-type nitrification tank. It is basically enough only if nitrite with a certain concentration is stored in the nitrite storage tank 12.

Anaerobic ammonium oxidizing bacteria are acclimatized in or introduced into the biological treatment tank 14 as anaerobic bacteria, and then the biological treatment tank 14 is maintained in an anaerobic atmosphere. For example, seed sludge, activated sludge, or anaerobic digested sludge, containing anaerobic ammonium oxidizing bacteria, may be acclimatized as anaerobic ammonium oxidizing bacteria, as described in Lectures in Japan Society on Water Environment 7th Symposium, 2004, p. 125. The present invention can be adapted to all bacteria which biologically denitrify ammonium contained in an ammonium-containing liquid in the anaerobic atmosphere, the bacteria using nitrite as a substrate.

As patterns of maintaining anaerobic ammonium oxidizing bacteria in the biological treatment tank 14, the anaerobic ammonium oxidizing bacteria may be floated in the tank 14. However, it is preferable to maintain the bacteria in the tank 14 as a biofilm formed by attaching the aforementioned sludge to a packing material, or to maintain the bacteria in the tank 14 as the entrapping immobilization pellets formed by entrapping and immobilizing the aforementioned sludge in an immobilizing material. Herein, the term "entrapping immobilization" includes immobilization of microorganisms in an immobilizing material by mixing a monomer material or a prepolymer material with the microorganisms to polymerize the mixture.

When the anaerobic ammonium oxidizing bacteria are maintained as the biofilm or the entrapping immobilization pellets, the biological treatment tank 14 is packed appropriately in an amount of 30 to 70 vol % when the tank 14 is a fixed bed type, and in an amount of 5 to 40 vol % when the tank 14 is a suspended particle type and an expansion type. The packing material used for the biofilm may be a material such as a nonwoven cloth, a plastic material, or a sponge material. In addition, various shapes of the biofilm may be used such as a plate-like shape, granular shape, and cylindrical shape.

Acrylamide, methylenebisacrylamide, triacrylformal, or the like may be appropriately used as the monomer material used for the entrapping immobilization pellets. As the prepolymer material, polyethylene glycol diacrylate and polyethylene glycol methacrylate is preferably used, and derivatives thereof can be suitably used. The entrapping immobilization pellets preferably have a shape with many irregularities on the surface, such as a rectangular shape, globular shape, and cylindrical shape, to be efficiently brought contact with an ammonium-containing liquid. Thereby, it is possible to improve efficiency in purging nitrogen components such as ammonium in an ammonium-containing liquid. The entrapping immobilization pellets preferably have a size of 1 to 10 mm, when the pellets have a shape of rectangles or globes.

As the microorganisms to be entrapped and immobilized, it is possible to use a pure strain of the anaerobic ammonium oxidizing bacteria, mixed microorganisms in activated sludge containing the anaerobic ammonium oxidizing bacteria, and the like. It is preferable that the amount of total cells of microorganisms in the entrapping immobilization pellets is $10^5$ cells/mL or more, and the amount of cells of anaerobic ammonium oxidizing bacteria is $1/10$ to $1/1,000$ of the amount of the total cells. As the reason, even though the microorganisms in the entrapping immobilization pellets generally exhibit activity at a concentration of $10^6$ cells/mL or more, the microorganisms can be grown at $10^8$ cells/mL or more by immobilizing so that the amount of total cells in the pellets is $10^5$ cells/mL or more, thereby improving the activity of anaerobic ammonium oxidizing bacteria more higher.

Table 1 shows a general composition example of entrapping immobilization pellets in which anaerobic ammonium oxidizing bacteria are entrapped and immobilized.

TABLE 1

| | |
|---|---|
| Condensate of anaerobic ammonium oxidizing bacteria ($10^9$ cells/mL) | 30 parts |
| Polyethylene glycol diacrylate | 10 parts |
| N,N,N',N'-tetramethylethylenediamine | 0.5 parts |
| Water | 59.25 parts |

When adding potassium persulfate of 0.25 parts to a suspension having the aforementioned composition in Table 1, the suspension is polymerized to be gelled. The gel is cut into a certain size to form entrapping immobilization pellets.

Next, the ammonium-containing liquid treatment apparatuses 10, 50, 60, 70, and 80 according to present invention will be described, comprising the aforementioned nitrite storage tank 12 and the biological treatment tank 14 as basic constituents. In those embodiments, the anaerobic ammonium oxidizing bacteria may be maintained by being floated in the biological treatment tank 14, or may be maintained on the condition of the biofilm in the tank 14, or may be maintained on the condition of entrapping immobilization pellets in the tank 14. However, the present embodiments will be described with reference in the condition that the bacteria are maintained in the entrapping immobilization pellets.

FIG. 1 shows an ammonium-containing liquid treatment apparatus 10 according to a first embodiment. The treatment apparatus 10 comprises: the biological treatment tank 14 in which the anaerobic ammonium oxidizing bacteria are present in an anaerobic atmosphere; an inflow section which flows the ammonium-containing liquid into the biological treatment tank 14; a discharge section which discharges the treated liquid in the biological treatment tank 14; a nitrite storage tank 12 which stores nitrite with a certain concentration; an addition device which adds nitrite to the biological treatment tank 14 from the nitrite storage tank 12; and an addition amount control device which controls the amount of nitrite added to the biological treatment tank 14.

More specifically, an ammonium-containing liquid is flowed into the biological treatment tank 14 via an inflow pipe 16 and an inflow pump 17 including the inflow section. The biological treatment tank 14 is packed with the entrapping immobilization pellets 24 which entrap and immobilize the anaerobic ammonium oxidizing bacteria, so that the entrapping immobilization pellets 24 are brought into contact with the ammonium-containing liquid flowing into the tank 14. In this case, in order to bring the pellets 24 into contact with the ammonium-containing liquid more efficiently, it is preferable to provide a stirrer, an anaerobic gas blower, and the like, for example (not shown in FIG. 1), so that the entrapping immobilization pellets 24 flow easily in the biological treatment tank 14.

An addition pipe 20 as the addition device is extended from the nitrite storage tank 12 disposed above the biological treatment tank 14 to the upper end of the biological treatment tank 14, which is branched multiply. Through the addition pipe 20, nitrite with a certain concentration stored in the nitrite storage tank 12 is added to the biological treatment tank 14. Therefore, ammonium contained in the ammonium-containing liquid and the added nitrite are denitrified at the same time by anaerobic ammonium oxidizing bacteria in an anaerobic atmosphere, so as to be purge as nitrogen gas. The liquid treated in the biological treatment tank 14 is discharged through a treated liquid pipe 18 formed as the discharge section outside the biological treatment tank 14. A screen 26 is provided on the side of the discharge section in the biological treatment tank 14 to prevent the entrapping immobilization pellets 24 from being discharged together with the treated liquid. In this manner, since nitrite with a certain concentration is stored in the nitrite storage tank 12, and stocked nitrite is added to the biological treatment tank 14 from the nitrite storage tank 12 in an amount corresponding to the necessary amount of nitrite, then an ammonium-containing liquid can be treated constantly stably, thereby providing a treated liquid with high quality constantly stably.

The addition pipe 20 is constituted by a main pipe 20A and a plurality of branch pipes 20B. A valve 22 is provided in the main pipe 20A as the addition amount control device, which controls the added amount of nitrite. The multiple branch pipes 20B branched from the main pipe 20A are located so that places to add nitrite are dispersed from the inflow section side to the discharge section side in the biological treatment tank 14. Therefore, it is possible to form a concentration distribution prevention mechanism which prevents from varying the concentration of nitrite added in the biological treatment tank 14. In this case, it is important to add nitrite via this concentration distribution prevention mechanism so that a highest nitrite nitrogen concentration is lower than 80 mg/L in the biological treatment tank 14. As the reason, although anaerobic ammonium oxidizing bacteria use nitrite as a substrate, activity of the bacteria is reduced at a nitrite nitrogen concentration of 80 mg/L or higher. In addition, when the concentration of nitrite nitrogen exceeds 80 mg/L locally in the biological treatment tank 14, activity of anaerobic ammonium oxidizing bacteria is reduced even if nitrite with a certain concentration is added to the biological treatment tank 14.

Figure 2:
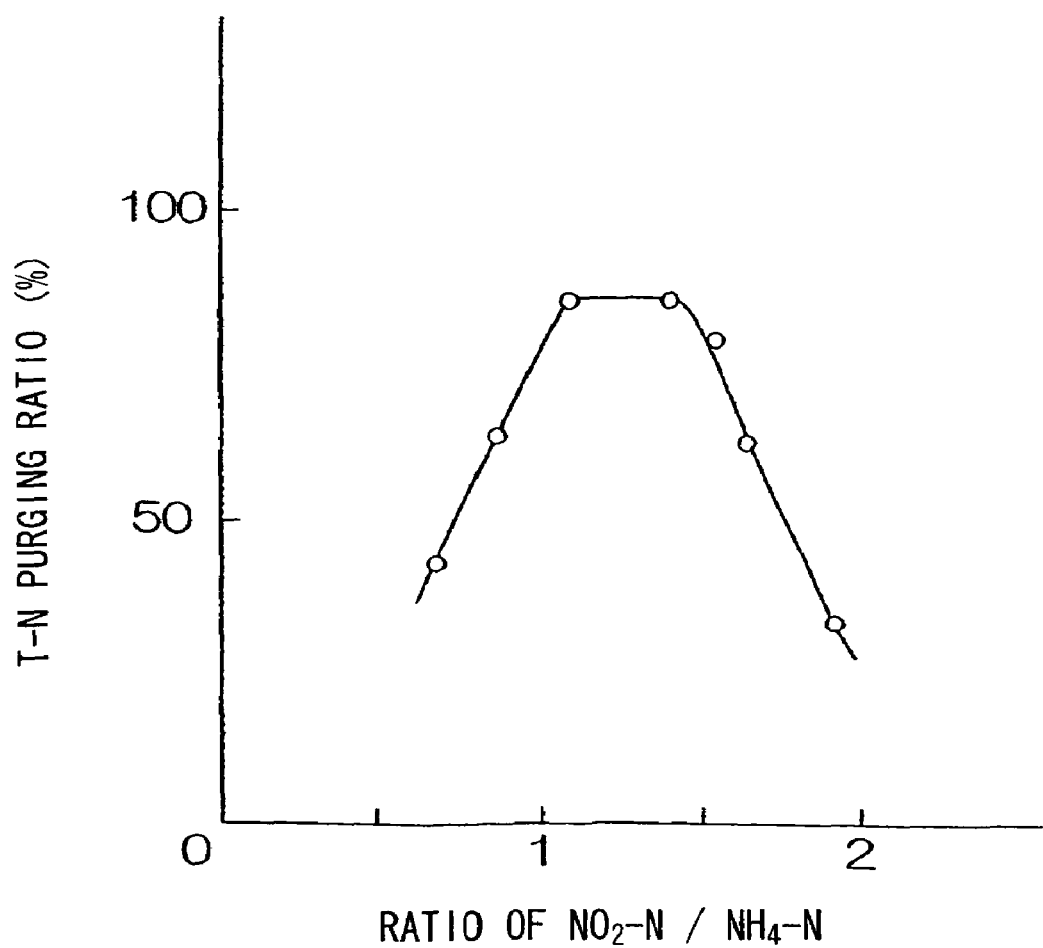
FIG. 2 is a graph showing a relationship between a ratio of the amount of nitrite nitrogen ($NO_2$—N) in nitrite to the amount of ammonium nitrogen in ammonium and a total ratio of purging nitrogen.

The amount of nitrite with a certain concentration added to the biological treatment tank 14 from the nitrite storage tank 12 is controlled by the valve 22, so that an amount of nitrite corresponding to the amount necessary for treating ammonium contained in an ammonium-containing liquid is added into the biological treatment tank 14. The necessary amount of nitrite is preferably set so that the amount of nitrite nitrogen in nitrite is 1 to 1.5 times of the amount of ammonium nitrogen in ammonium. More specifically, as shown in FIG. 2, a ratio between the amount of nitrite nitrogen ($NO_2$—N) in nitrite and the amount of ammonium nitrogen ($NH_4$—N) in ammonium has a close relation with a total ratio of purging nitrogen from an ammonium-containing liquid (T-N purging ratio). If the ratio between nitrite and ammonium is 1 to 1.5, the T-N purging ratio is highest. On the other hand, if less than 1 or more than 1.5, the T-N purging ratio is reduced drastically.

Figure 3:
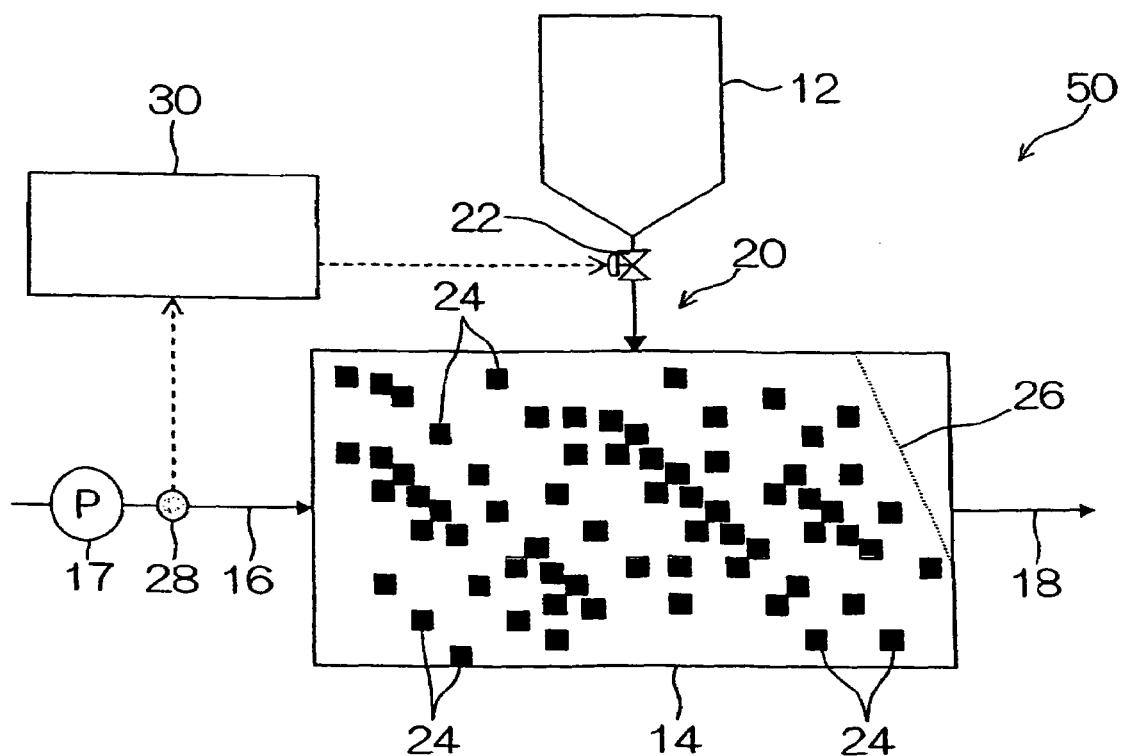
FIG. 3 is a general schematic drawing of an ammonium-containing liquid treatment apparatus according to a second embodiment of the present invention.

FIG. 3 shows an ammonium-containing liquid treatment apparatus 50 according to a second embodiment. In FIG. 3, the same member or device as in the first embodiment in FIG. 1 will be described with the same reference numeral, and the description will be omitted. The concentration distribution prevention mechanism is not shown in FIGS. 3 to 6.

As shown in FIG. 3, a concentration-measuring instrument 28 is provided in the middle of an inflow pipe 16, which measures the concentration of ammonium nitrogen in an ammonium-containing liquid. The values measured in the concentration-measuring instrument 28 are sent to a nitrite control unit 30 which is a type of monitoring the concentration. The ammonium nitrogen concentration may be measured in the concentration-measuring instrument 28 continuously or intermittently. The nitrite control unit 30 calculates the amount of nitrite added corresponding to the necessary amount of nitrite from the results measured in the concentration-measuring instrument 28, and controls the opening of a valve 22 based on the calculated addition amount. It is preferable to previously measure the relation between the amount of nitrite added and the valve opening, and input the relation in the nitrite control unit 30. Therefore, it is possible to control appropriately the amount of nitrite added in accordance with the ammonium concentration in the ammonium-containing liquid. In the ammonium-containing liquid treatment apparatus 50 according to the second embodiment of the present invention, it is possible to treat effectively when the ammonium concentration in an ammonium-containing liquid varies.

Incidentally, although not shown in FIG. 3, when the volume of the ammonium-containing liquid flowing into the biological treatment tank 14 also varies, an inflow volume-measuring instrument to measure the inflow volume is preferably provided in the inflow pipe 16 in addition to the concentration-measuring instrument 28, thereby controlling the amount of nitrite added with reference to the concentration and the inflow volume.

Figure 4:
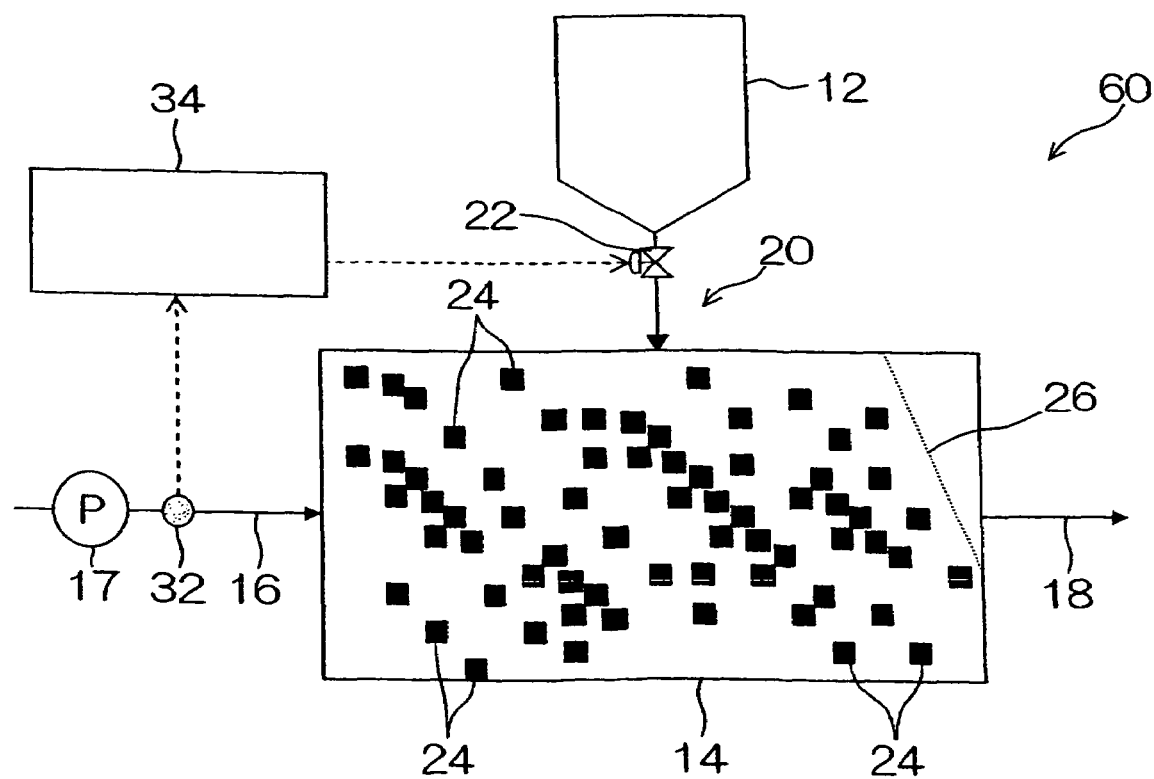
FIG. 4 is a general schematic drawing of an ammonium-containing liquid treatment apparatus according to a third embodiment of the present invention.

FIG. 4 shows an ammonium-containing liquid treatment apparatus 60 according to a third embodiment. In FIG. 4, the same member or device as in the first and second embodiments will be described with the same reference numeral, and the description will be omitted.

As shown in FIG. 4, an inflow volume-measuring instrument 32 is provided in the middle of an inflow pipe 16, which measures the inflow volume of an ammonium-containing liquid. The values measured in the inflow volume-measuring instrument 32 are sent to a nitrite control unit 34 which is type of monitoring inflow volume. The inflow volume of the ammonium-containing liquid may be measured in the inflow volume-measuring instrument 32 continuously or intermittently. The nitrite control unit 34 controls the opening of a valve 22, so that the added amount of nitrite is changed to the aforementioned necessary amount of nitrite according to variations in the inflow volume measured in the inflow volume-measuring instrument 32. It is preferable to determine the necessary amount of nitrite previously by analyzing the concentration of ammonium nitrogen in the ammonium-containing liquid.

In the treatment apparatus 60 according to the third embodiment, it is possible to treat effectively when an ammonium-containing liquid has a certain ammonium concentration as in development wastewater.

Figure 5:
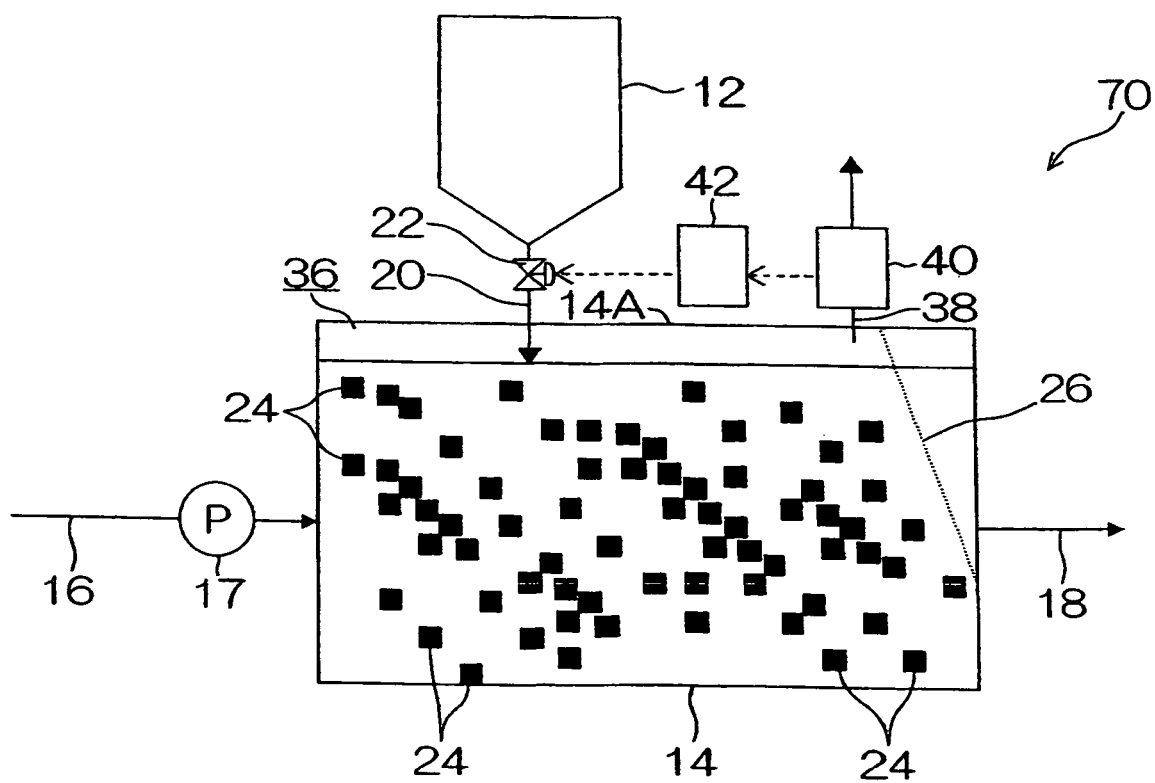
FIG. 5 is a general schematic drawing of an ammonium-containing liquid treatment apparatus according to a fourth embodiment of the present invention.

FIG. 5 shows apparatus 70 for treating an ammonium-containing liquid according to a fourth embodiment. In FIG. 5, the same member or device as in the first to third embodiments will be described with the same reference numeral, and the description will be omitted.

As shown in FIG. 5, a biological treatment tank 14 is formed as a closed-type tank, and a trap 36 is formed in an upper space of the tank 14 to pool nitrogen gas produced by reaction of ammonium with nitrite in the tank 14. A gas recovery pipe 38 is connected to an upper board 14A of the biological treatment tank 14, which recovers nitrogen gas pooled in the trap 36. It is preferable to provide a liquid seal mechanism (not shown) to prevent nitrogen gas generated in the biological treatment tank 14 from being leaked together with the treated liquid in a connection section which connects a treated liquid pipe 18 to the biological treatment tank 14. As the liquid seal mechanism, a known mechanism such as a liquid seal U-tube may be used.

A gas production rate-measuring instrument 40 is provided in the middle of the gas recovery pipe 38, in which sequentially measures the amount of gas flowing in the gas recovery pipe 38 to determine the production rate (L/min) of nitrogen gas generated in the biological treatment tank 14. Although it is strictly considered that gas recovered in the gas recovery pipe 38 may contain an air component brought from an ammonium-containing liquid, the gas contains a component in an extremely small amount, and thus such the component is ignored here. Herein, the gas production rate refers to a nitrogen gas production rate. As the gas production rate-measuring instrument 40, a vortex flowmeter, float flowmeter, or integrating flowmeter may be preferably used, for example.

The values measured in the gas production rate-measuring instrument 40 are sequentially inputted into a nitrite control unit 42 which is type of monitoring nitrogen gas. The nitrite control unit 42 changes the added amount of nitrite, and monitors variations in the nitrogen gas production rate Vn (L/min) which is measured in the gas production rate-measuring instrument 40 when the added amount is changed, so that an added amount of nitrite is controlled by a valve 22. When the gas production rate Vn is not changed corresponding to the variations in the added amount of nitrite, the added amount of nitrite is set as the necessary amount of nitrite.

Figure 6:
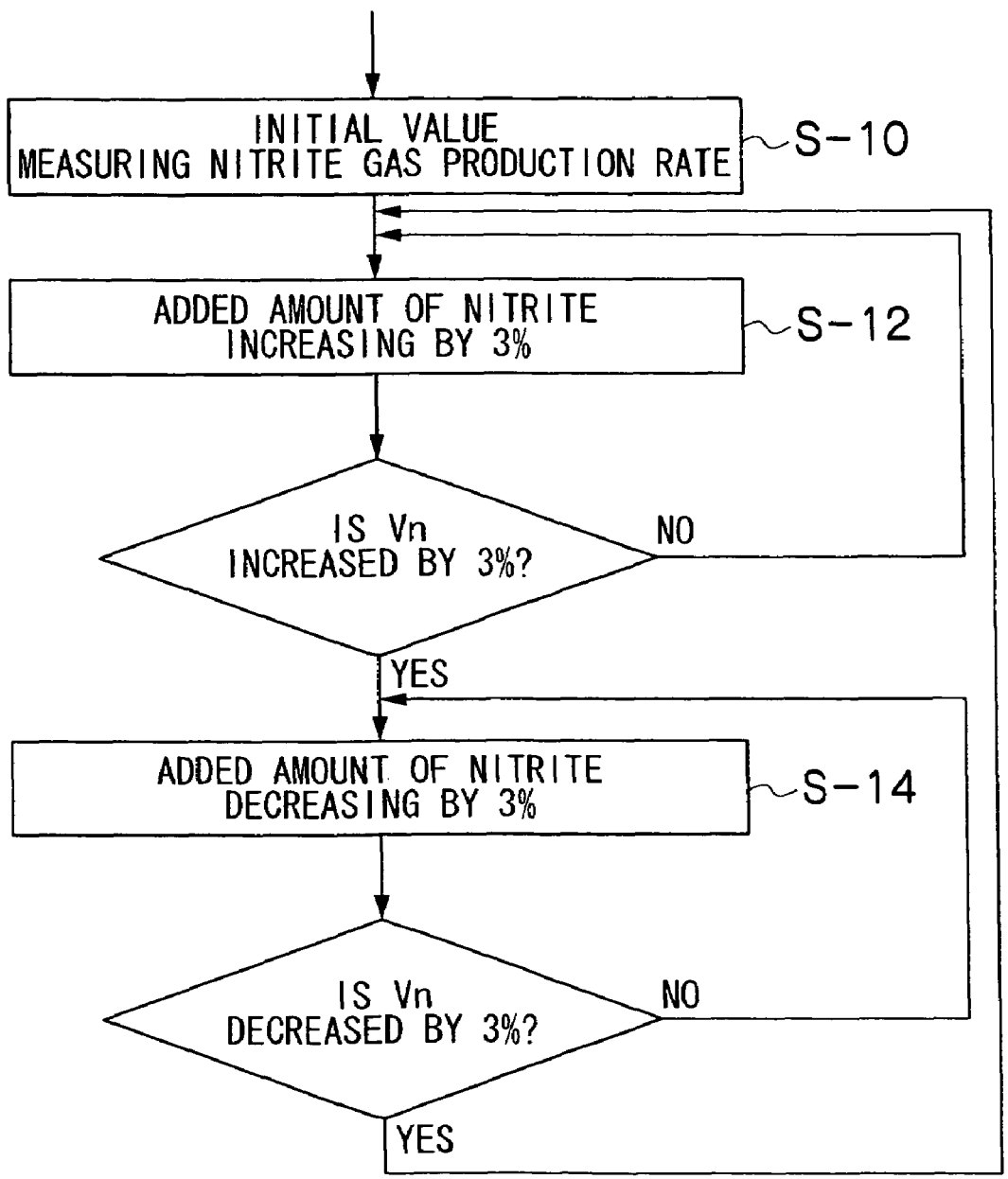
FIG. 6 is a flowchart showing a sequence of a control program in a nitrite automatic control system by monitoring nitrogen gas generation.

For example, as shown in FIG. 6, in a nitrite control program of monitoring nitrogen gas generation, first, the nitrogen gas production rate corresponding to the added amount of nitrite is measured at the initial stage of operation of the treatment apparatus 10, and the amount of nitrite added corresponding to this gas production rate Vn is used as the reference addition amount (step S10).

Next, the nitrite control unit 42 causes the valve 22 to open so as to increase the amount of nitrite added to the biological treatment tank 14 from a nitrite storage tank 12 by 3% (either wt % or vol %) with respect to the standard added amount (step S12). Then, the nitrite control unit 42 monitors whether or not the gas production rate Vn measured in the gas production rate-measuring instrument 40 is increased by increasing the added amount of nitrite by 3%. When the gas production rate Vn is increased (by 3%, for example) corresponding to an increase in the added amount of nitrite, the added amount of nitrite may be insufficient, and thus the step S12 is repeated to increase the amount of nitrite added by further 3% with respect to the standard added amount.

When the gas production rate Vn is not increased in direct proportion to an increase in the added amount of nitrite, the added amount of nitrite is excessive, and then the activity of anaerobic ammonium oxidizing bacteria may be reduced. Thus, the valve 22 is closed to decrease the added amount of nitrite by 3% (step S14). Then, the nitrite control unit 42 monitors whether or not the gas production rate Vn measured in the gas production rate-measuring instrument 40 is decreased by decreasing the added amount of nitrite by 3%. When the gas production rate Vn is decreased (by 3%, for example) corresponding to a decrease in the added amount of nitrite, the step S12 is repeated. On the other hand, when the gas production rate Vn is not decreased, nitrite may still be excessive, and thus the step S14 is repeated.

Operations of the steps S12 to S14 are repeated to determine an added amount of nitrite that the gas production rate is not changed. In this way, the determined amount of nitrite is set as the necessary amount of nitrite, the added amount of nitrite is controlled. Therefore, it is possible to control appropriately the added amount of nitrite even if the concentration of ammonium nitrite in the ammonium-containing liquid or the inflow volume of the liquid is not measured. Furthermore, it is also possible to control the added amount of nitrite corresponding to variations in the treatment load such as the ammonium concentration and the inflow volume. In the aforementioned program, the added amount of nitrite is increased or decreased by 3%, but the amount is preferably increased or decreased by 2 to 5% as a percentage appropriately selected. As the reason, an increase or a decrease in the gas production rate cannot be accurately monitored if the amount is increased or decreased by less than 2%. On the other hand, the nitrite concentration in the biological treatment tank 14 may be drastically increased if the amount is increased or decreased by more than 5%. For example, when the step S12 or the step S14 is repeated, nitrite may be increased or decreased by 2% instead of 3%, as a next cycle.

Figure 7:
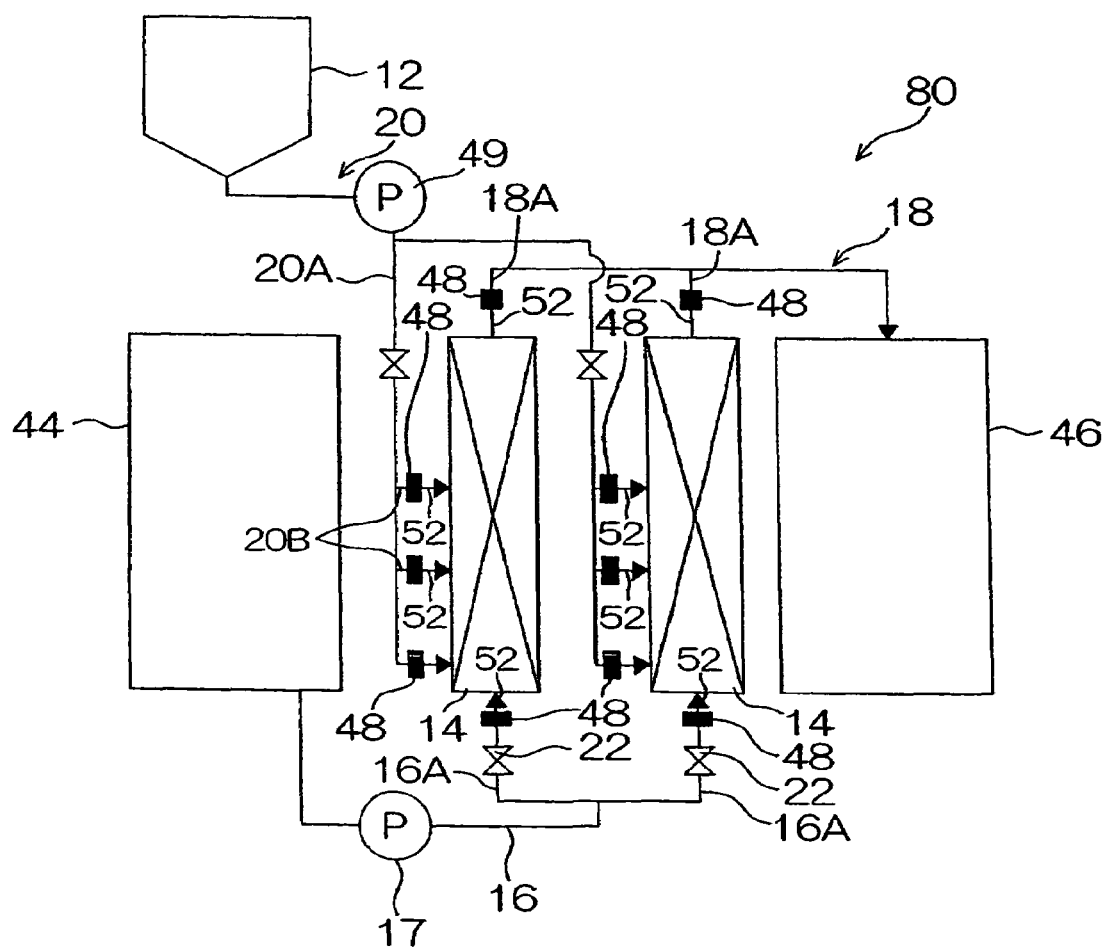
FIG. 7 is a general schematic drawing of an ammonium-containing liquid treatment apparatus according to a fifth embodiment of the present invention.

FIG. 7 shows an ammonium-containing liquid treatment apparatus 80 according to a fifth embodiment. In FIG. 7, the same member or device as in the first to fourth embodiments will be described with the same reference numeral, and the description will be omitted here.

As shown in FIG. 7, the treatment apparatus 80 comprises: an ammonium storage tank 44 which stores an ammonium-containing liquid; a nitrite storage tank 12 which stores nitrite with a certain concentration; vertical biological treatment tanks 14 having a removable cartridge structure; and a treated liquid storage tank 46 which stores the liquid treated in the biological treatment tanks 14. Preferably, each of the cartridge-type biological treatment tanks 14 is a closed cylinder vessel, and is packed with entrapping immobilization pellets 24 (not shown in FIG. 7) as a fixed bed.

An inflow pipe 16 allows an ammonium-containing liquid in the ammonium storage tank 44 to flow into the biological treatment tanks 14, and has two branches on the top (on the side of the biological treatment tanks). Valves 22 are provided in the middle of the two branched pipes 16A, and male parts of one-touch connectors 48 are provided on the tops of the two pipes 16A, respectively. An addition pipe 20 for adding nitrite in the nitrite storage tank 12 to the biological treatment tanks 14 is constituted by a main pipe 20A and a plurality of branch pipes 20B branched, so that nitrite is added to various places ranging from the bottom to the top of the biological treatment tanks 14. An addition pump 49 is provided in the main pipe 20A, and male parts of the one-touch connectors 48 are provided on the tops of the branch pipes 20B. Furthermore, a treated water pipe 18 for water treated in the biological treatment tanks 14 has two branches on the top (on the side of the biological treatment tanks), and male parts of the one-touch connectors 48 are provided on the tops of the two pipes 18A, respectively.

On the other hand, connection pipes 52 are respectively provided on the lower ends, the upper ends, and the lateral sides of the biological treatment tanks 14, and female parts of the one-touch connectors 48 are provided on the tops of the respective connection pipes 52. Thus, the two biological treatment tanks 14 can be removably attached to the inflow pipe 16, the treated water pipe 18, and the addition pipe 20, via the one-touch connectors 48.

Although the treatment apparatus 80 according to the present embodiment is constituted by removably two biological treatment tanks 14, the number of the biological treatment tanks 14 may be one or more. The inflow pipe 16, the treated water pipe 18, and the addition pipe 20 may be formed with one or more branches corresponding to the number of the tanks 14.

In the treatment apparatus 80 constituted in this manner according to the fifth embodiment, a plurality of the biological treatment tanks 14 can be used by rotation, as a type of merry-go-round. Furthermore, it is convenient if one of the multiple biological treatment tanks 14 is used as a reserved biological treatment tank 14 when anaerobic ammonium oxidizing bacteria are killed in the busy biological treatment tank 14, or when activity of the bacteria is reduced in the busy tank 14. Accordingly, the treatment apparatus 80 according to the fifth embodiment is effective when treating small-scale wastewater containing ammonium with a certain concentration such as development wastewater.

Hereinafter, examples of the present invention will be described. However, the present invention should not be limited to those examples.

EXAMPLE 1

In Example 1, an ammonium-containing liquid was treated using treatment apparatus 10 in FIG. 1.

The composition of entrapping immobilization pellets to be packed in a biological treatment tank 14 is shown in Table 2.

TABLE 2

| | |
|---|---|
| Condensate of sludge accumulating anaerobic ammonium oxidizing bacteria | 50 parts |
| Polyethylene glycol diacrylate | 4 parts |
| Acrylamide | 1 part |
| N,N,N',N'-tetramethylethylenediamine | 0.5 parts |
| Potassium persulfate | 0.25 parts |
| Water | 44.25 parts |

The aforementioned composition was gelled by addition of potassium persulfate, and the gel was formed into 3 mm×3 mm squares to prepare entrapping immobilization pellets 24.

Test Conditions for Treatment Apparatus in Example 1
- Ammonium containing liquid: an industrial wastewater in which a concentration of ammonium nitrogen was between 90 to 120 mg/L was used.
- Necessary amount of nitrite: an amount of nitrite with a certain concentration added to the biological treatment tank 14 from a nitrite storage tank 12 was controlled so that the amount of nitrite nitrogen ($NO_2$—N) was 1.3 times of the amount of ammonium nitrogen ($NH_4$—N) which was 120 mg/L.
- Retention time in biological treatment tank 14: 1 hour
- Packing ratio of entrapping immobilization pellets: 20%
- The entrapping immobilization pellets were mechanically stirred to be flowed in the biological treatment tank 14.

As a result of continuous treatment under the aforementioned conditions, ammonium contained in the ammonium-containing liquid and nitrite added from the nitrite storage tank 12 were denitrified in the biological treatment tank 14 at the same time, and then the treated liquid could be maintained at a total nitrogen concentration of 30 to 50 mg/L in a stable manner.

EXAMPLE 2

In Example 2, an ammonium-containing liquid was treated with the same entrapping inmobilization pellets as in Example 1 under the same test conditions as in Example 1, using the treatment apparatus 50 in FIG. 3 as a present invention method 1, the treatment apparatus 60 in FIG. 4 as a present invention method 2, and the treatment apparatus 70 in FIG. 5 as a present invention method 3. In the treatment apparatus 70 in FIG. 5, the added amount of nitrite was controlled by the steps shown in FIG. 6.

The results in Example 2 are shown in Table 3. Table 3 shows a denitrification without addition of nitrite to the biological treatment tank 14 in the treatment apparatus 10, and a denitrification by addition of methanol instead of nitrite to the biological treatment tank 14 in the treatment apparatus 50, as conventional methods 1 and 2.

TABLE 3

|  | Figure number of treatment apparatus | Total nitrogen concentration in treated liquid |
|---|---|---|
| Present invention method 1 | FIG. 3 | 25-36 mg/L |
| Present invention method 2 | FIG. 4 | 28-40 mg/L |
| Present invention method 3 | FIG. 5 | 20-32 mg/L |
| Conventional method 1 | Nitrite not added in FIG. 3 | 92-124 mg/L |
| Conventional method 2 | Methanol added instead of methanol in FIG. 3 | 88-115 mg/L |

As shown in Table 3, in the present invention methods 1 to 3, each of total nitrogen concentrations of treated liquids was 20 to 40 mg/L, and then ammonium-containing liquids could be treated in a stable manner.

On the other hand, in the conventional methods 1 and 2, each of total nitrogen concentrations in the treated liquids was 88 to 124 mg/L, and then ammonium in ammonium-containing liquids could not be treated almost at all.

In the ammonium treatment by the conventional methods, the nitrification reaction and the denitrification reaction are required. In this case, the nitrification reaction needs a retention time between 4 to 6 hours, and the denitrification reaction needs a retention time between 3 to 6 hours. Additionally, the treatment by the conventional methods needs methanol in an amount three times greater than the amount of nitrogen. Therefore, large-scale apparatus is required for the treatment by the conventional methods.

On the other hand, in the treatment apparatus according to the present invention, an ammonium-containing liquid can be treated constantly stably by adding a necessary amount of nitrite to the biological treatment tank 14 from a nitrite storage tank 12 storing nitrite with a certain concentration, while the ammonium-containing liquid is brought into contact with anaerobic ammonium oxidizing bacteria in an anaerobic atmosphere in a biological treatment tank 14. Accordingly, while it is possible to reduce the size of treatment apparatus as compared with a conventional method that a nitrification tank and a denitrification tank are required, the treatment can be operated at a lower running cost, and then it is suggested that the method according to the present invention is an extremely inexpensive treatment method.

EXAMPLE 3

In Example 3, an ammonium-containing liquid was treated using the treatment apparatus 80 in FIG. 7.

The composition of entrapping immobilization pellets to be packed in a biological treatment tank 14 is shown in Table 4.

TABLE 4

| Condensate of sludge accumulating anaerobic ammonium oxidizing bacteria | 34 parts |
| Polyethylene glycol diacrylate | 6 parts |
| N,N,N',N'-tetramethylethylenediamine | 0.5 parts |
| Potassium persulfate | 0.25 parts |
| Water | 59.25 parts |

The aforementioned composition was gelled by addition of potassium persulfate, and the gel was formed into 3 mm×3 mm squares to prepare entrapping immobilization pellets 24.

Test Conditions for Treatment Apparatus in Example 3
  Ammonium containing liquid: a diluted development wastewater in which a concentration of ammonium nitrogen was 2,000 mg/L was used.
  Necessary amount of nitrite: the amount of nitrite with a certain concentration added to the biological treatment tank 14 from a nitrite storage tank 12 was controlled so that the amount of nitrite nitrogen ($NO_2$—N) was 1.3 times of the amount of ammonium nitrogen ($NH_4$—N) which was 2,000 mg/L.
  Retention time in biological treatment tanks 14: 4 hours
  Packing ratio of entrapping immobilization pellets 24: 30%
  The entrapping immobilization pellets were mechanically stirred to be flowed in the biological treatment tanks 14.

As a result of continuous treatment under the aforementioned conditions, ammonium contained in the ammonium-containing liquid, and nitrite added from the nitrite storage tank 12 were denitrified in the biological treatment tanks 14 at the same time, and then the treated liquid could be maintained at a total nitrogen concentration of 160 to 230 mg/L in a stable manner.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method for treating an ammonium-containing liquid which biologically denitrifies ammonium contained in the ammonium-containing liquid in an anaerobic atmosphere, the method comprising the steps of:
  bringing the ammonium-containing liquid into contact with anaerobic bacteria in a biological treatment tank, the anaerobic bacteria having an ability to biologically denitrify the ammonium in the anaerobic atmosphere; and
  adding nitrite to the biological treatment tank from a nitrite storage tank concurrently with the bringing step, the nitrite storage tank storing the nitrite with a certain concentration;
  wherein the nitrite is added from the nitrite storage tank to a plurality of places which are variously located in the biological treatment tank so that a highest concentration of nitrite nitrogen is lower than 80 mg/L in the biological treatment tank.

2. The method for treating the ammonium-containing liquid defined in claim 1, further comprising the steps of:
  measuring a concentration of ammonium nitrogen in the ammonium-containing liquid;
  calculating a necessary amount of the nitrite with respect to the concentration measured in the measuring step; and
  controlling an amount of the nitrite added in the adding step according to the necessary amount calculated in the calculating step.

3. The method for treating the ammonium-containing liquid as defined in claim 2, wherein the necessary amount of the nitrite is set so that an amount of nitrite nitrogen in the nitrite is 1 to 1.5 times of an amount of the ammonium nitrogen in the ammonium.

4. The method for treating the ammonium-containing liquid as defined in claim 1, further comprising the steps of:

measuring an inflow volume of the ammonium-containing liquid flowing into the biological treatment tank; and changing an amount of the nitrite added in the adding step corresponding to variations in the inflow volume measured in the measuring step.

5. The method for treating the ammonium-containing liquid as defined in claim 1, further comprising the steps of:

changing an amount of the nitrite added in the adding step to the biological treatment tank from the nitrite storage tank;

measuring a production rate (L/min) of nitrogen gas produced in the biological treatment tank when changing the amount of the nitrite in the changing step; and controlling the amount of the nitrite added in the adding step to a necessary amount of the nitrite, the necessary amount of the nitrite being the amount of the nitrite which is added when the measured production rate are not changed corresponding to the amount of the nitrite changed in the changing step.

6. An apparatus for treating an ammonium-containing liquid which denitrifies ammonium contained in the ammonium-containing liquid biologically in an anaerobic atmosphere, the apparatus comprising:

a biological treatment tank which includes anaerobic bacteria having an ability to denitrify the ammonium biologically in the anaerobic atmosphere;

an inflow section which allows the ammonium-containing liquid to flow into the biological treatment tank;

a discharge section which discharges the liquid treated in the biological treatment tank;

a nitrite storage tank which stores nitrite with a certain concentration;

an addition device which adds the nitrite to the biological treatment tank from the nitrite storage tank; and an addition amount control device which controlling an amount of the nitrite added by the addition device;

wherein:

the biological treatment tank has a removable cartridge structure;

a plurality of connection sections are provided respectively in the inflow section, the discharge section, and the addition device; and the biological treatment tank is connected via the connection sections to the inflow section, the discharge section, and the addition device.

7. The apparatus for treating the ammonium-containing liquid as defined in claim 6, wherein the addition device comprises a concentration distribution prevention mechanism which prevents a concentration of the added nitrite from varying in the biological treatment tank.

8. The apparatus for treating the ammonium-containing liquid as defined in claim 6, further comprising a concentration measurement device which measures a concentration of ammonium nitrogen in the ammonium-containing liquid, wherein the addition amount control device controls the added amount of the nitrite according to the concentration measured by the concentration measurement device.

9. The apparatus for treating the ammonium-containing liquid as defined in claim 6, further comprising an inflow volume measurement device which measures an inflow volume of the ammonium-containing liquid flowing into the biological treatment tank, wherein the addition amount control device controls the added amount of the nitrite according to the inflow volume measured by the inflow volume measurement device.

10. The apparatus for treating the ammonium-containing liquid as defined in claim 6, further comprising a gas production rate measurement device which measures a production rate (L/min) of nitrogen gas produced in the biological treatment tank when changing the amount of the nitrite added by the addition device, wherein the addition amount control device controls the added amount of the nitrite according to variations in the production rate measured by the gas production rate measurement device.

11. An apparatus for treating an ammonium-containing liquid which denitrifies ammonium contained in the ammonium-containing liquid biologically in an anaerobic atmosphere, the apparatus comprising: a plurality of biological treatment tanks which include anaerobic bacteria having an ability to denitrify the ammonium biologically in the anaerobic atmosphere; a plurality of inflow sections which allow the ammonium-containing liquid to flow into the biological treatment tanks; a plurality of discharge sections which discharge the liquid treated in the biological treatment tanks; a nitrite storage tank which stores nitrite with a certain concentration; a plurality of addition devices which add the nitrite to the biological treatment tanks from the nitrite storage tank; and an addition amount control device which controlling an amount of the nitrite added by the addition devices, wherein:

each of the biological treatment tanks has a removable cartridge structure;

a plurality of connection sections are provided respectively in the inflow sections, the discharge sections, and the addition devices; and the biological treatment tanks are connected via the connection sections to the inflow sections, the discharge sections, and the addition devices.

12. The apparatus for treating the ammonium-containing liquid as defined in claim 11, wherein each of the addition devices comprises a concentration distribution prevention mechanism which prevents a concentration of the added nitrite from varying in each of the biological treatment tanks.

13. The apparatus for treating the ammonium-containing liquid as defined in claim 11, further comprising a concentration measurement device which measures a concentration of ammonium nitrogen in the ammonium-containing liquid, wherein the addition amount control device controls the added amount of the nitrite according to the concentration measured by the concentration measurement device.

14. The apparatus for treating the ammonium-containing liquid as defined in claim 11, further comprising an inflow volume measurement device which measures an inflow volume of the ammonium-containing liquid flowing into each of the biological treatment tanks, wherein the addition amount control device controls the added amount of the nitrite according to the inflow volume measured by the inflow volume measurement device.

15. The apparatus for treating the ammonium-containing liquid as defined in claim 11, further comprising a gas production rate measurement device which measures a production rate (L/min) of nitrogen gas produced in each of the biological treatment tanks when the amount of the nitrite added by each of the addition devices is changed, wherein the addition amount control device controls the added amount of the nitrite according to variations in the production rate measured by the gas production rate measurement device.

16. An apparatus for treating an ammonium-containing liquid which denitrifies ammonium contained in the ammonium-containing liquid biologically in an anaerobic atmosphere, the apparatus comprising:
- a biological treatment tank which includes anaerobic bacteria having an ability to denitrify the ammonium biologically in the anaerobic atmosphere;
- an inflow section which allows the ammonium-containing liquid to flow into the biological treatment tank;
- a discharge section which discharges the liquid treated in the biological treatment tank;
- a nitrite storage tank which stores nitrite with a certain concentration;
- an addition device which adds the nitrite to the biological treatment tank from the nitrite storage tank;
- an addition amount control device which controlling an amount of the nitrite added by the addition device; and
- a gas production rate measurement device which measures a production rate (L/min) of nitrogen gas produced in the biological treatment tank when changing the amount of the nitrite added by the addition device, wherein the addition amount control device controls the added amount of the nitrite according to variations in the production rate measured by the gas production rate measurement device.

* * * * *